United States Patent [19]
Tankelevich

[11] Patent Number: 6,014,148
[45] Date of Patent: Jan. 11, 2000

[54] METHOD FOR GENERATING TWO DIMENSIONAL AND THREE DIMENSIONAL SMOOTH CURVES AND FOR DRIVING CURVE FORMING DEVICES

[75] Inventor: Roman L. Tankelevich, Lakewood, Colo.

[73] Assignee: Laser Products, Inc., Oak Ridge, Tenn.

[21] Appl. No.: 08/782,768

[22] Filed: Jan. 13, 1997

Related U.S. Application Data

[63] Continuation-in-part of application No. 08/291,444, Aug. 17, 1994, Pat. No. 5,594,852.

[51] Int. Cl.$^7$ .................................................. G06T 11/00
[52] U.S. Cl. ............................................................. 345/442
[58] Field of Search ................................... 345/348, 335, 345/334, 346, 441, 442, 433, 170, 469; 112/102.5; 364/474.24

[56] References Cited

U.S. PATENT DOCUMENTS

| | | | |
|---|---|---|---|
| 4,864,520 | 9/1989 | Setoguchi et al. | 364/560 |
| 5,133,052 | 7/1992 | Bier et al. | 345/433 X |
| 5,185,855 | 2/1993 | Kato et al. | 345/44 X |
| 5,212,770 | 5/1993 | Smith et al. | 345/335 |
| 5,379,707 | 1/1995 | Asano | 112/102.5 |
| 5,425,109 | 6/1995 | Saga et al. | 382/187 |
| 5,471,574 | 11/1995 | Prasad | 345/442 |

*Primary Examiner*—Almis R. Jankus
*Attorney, Agent, or Firm*—Sheridan Ross P.C.

[57] ABSTRACT

A method for generating curves and an associated method for operating a curve forming device are disclosed. According to a preferred implementation, the curve is formed as a piecewise series of arc segments (14' and 16'). The shapes of the segments (14' and 16') are derived by defining a control polygon ($P_0$, $P_{12}$, $P_3$), defining an outbound polygon ($P_0$, $P_1'$, $P_2'$, $P_3$) relative to the control polygon, and determining centers of curvature (18' and 20') and radii for the segments (14' and 16') relative to the outbound polygon. The resulting curve can be two or three dimensional and can be expressed in conventional numerical control languages for implementation by curve forming devices.

22 Claims, 15 Drawing Sheets

METHOD FOR GENERATING TWO DIMENSIONAL AND THREE DIMENSIONAL SMOOTH CURVES AND FOR DRIVING CURVE FORMING DEVICES

RELATED U.S. APPLICATION DATA

This application is a continuation-in-part of Application Ser. No. 08/291,444 filed Aug. 17, 1994, now U.S. Pat. No. 5,594,852.

FIELD OF THE INVENTION

The present invention relates generally to generating curves and, in particular, to a method for generating curves that can be directly implemented by curve forming devices. An associated method for operating a curve forming device is also disclosed.

BACKGROUND OF THE INVENTION

Considerable effort has been dedicated to CAD/CAM technology and, more specifically, to curve generating technology for implementing and driving curve forming devices, including graphic devices such as plotters and cathode ray tube "CRT" devices and machine tools such as milling machines, cutting machines and other computer numerically controlled "CNC" machines. Much of this effort has been directed to providing curve generating tools which are easy for a designer to use and yet allow flexibility for designing a variety of smooth, aesthetically pleasing curves, including both two-dimensional and three-dimensional curves or contours. Additionally, it is desirable to minimize the numerical processing complexity and computer resources associated with curve generation, and to increase processing speed.

Among the more popular curve generating techniques are the Bezier curve and B-spline methodologies. Referring to FIG. 11, the Bezier curve method illustrates some of the attributes and difficulties associated with conventional computer aided curve generation. In one application of the Bezier curve technology, a designer can generate a curve 1 by positioning two pairs of points $P_0$ and $P_3$, and $P_1$ and $P_2$, on a computer screen. The first pair of points $P_0$ and $P_3$ defines the end points for the curve 1. The other pair of points $P_1$ and $P_2$ are control points for determining the shape of the curve 1 between the end points $P_0$ and $P_3$. Two line segments, $P_0$, $P_1$ and $P_2$, $P_3$ each connecting one of the end points $P_0$ or $P_3$ to one of the control points $P_1$ or $P_2$, are sometimes referred to as "handles". Additionally, these two pairs of points $P_0$ and $P_3$, and $P_1$ and $P_2$, can be considered as defining vertices of a polygon 2 commonly designated the "control polygon" which includes a base 3 defined by the end points $P_0$ and $P_3$ and sides 4, 5 and 6 defined relative to the control points $P_1$ and $P_2$.

According to this method, the coordinates of the vertices of the control polygon 2 are used to calculate the coefficients of a polynomial that explicitly describes the designed curve 1. The curve 1 is then derived point by point from the polynomial. As a result, the total number of points involved can be restrictively large and unevenly distributed, thereby complicating derivation.

A characteristic of the designed curve 1 is that it is tangent to the handles $P_0$, $P_1$ and $P_2$, $P_3$ at the end points $P_0$ and $P_3$. An additional characteristic of the designed curve 1 is that the curve 1 lies within the convex hull of the control polygon 2, i.e., the hull-like shape defined by the sides 4, 5 and 6 of the control polygon 2. The shape of the designed curve 1 therefore mimics, to some extent, the shape of the control polygon 2, thereby aiding the designer. Furthermore, the designed curve 1 tends to be smooth and aesthetically pleasing.

Unfortunately, such a Bezier curve cannot be directly implemented by most curve forming devices. This is because the Bezier curve is generally a higher order polynomial and most curve forming devices are capable of forming only certain geometric shapes such as line segments, corners and circular arcs of known radius and length. In this regard, the existing controllers of most curve forming devices and software libraries of most graphical tools are line and arc oriented. Specifically, most controllers use numerical control languages, for example, DXF, TIFF, EIA, HP-GL and IGES, that are based on these simple outputs.

In order to drive conventional curve forming devices, the Bezier curve is normally translated into a series of lines or simple arcs which approximate the Bezier curve. This translation can be performed by first selecting a number of points along the curve to serve as segment end points and then defining line or arc segments to connect the end points. However, this translation is a time consuming process involving complex algorithms and substantial computing resources. In particular, providing the desired transitional smoothness at the points where individual segments join can be a computationally intensive process. Additionally, because the translated curve is an approximation of the Bezier curve it can vary significantly from the originally designed curve depending, for example, on the number of segments used to create the desired curve and the process for translating the higher order polynomial curve to segment instructions to drive the curve forming device. The resulting curve therefore may not match the curve originally selected by the designer. Consequently, the designer loses some degree of control over the final design which can result, for example, in improperly fitted parts of a final product.

SUMMARY OF THE INVENTION

The present invention provides a method for use in generating curves that can be directly implemented by conventional curve forming devices. The need to translate the designed curve into a segmented approximation thereof for implementation is eliminated and the invention allows for formation of curves, using conventional curve forming devices, that match the curve selected by the designer.

It is a particular advantage of the present invention, in a preferred form, that a designer can generate and implement a great variety of smooth, complex and aesthetically pleasing curves using simple input commands, e.g., by defining curve end points and one or more control points (stated differently, by defining a control polygon). Based on these inputs, a curve composed of arc segments, line segments or a combination of both ("segments") can be directly generated. Moreover, the resulting curve can be provided such that it is smooth at connections between contiguous segments. Expressed mathematically, the first derivative of the curve approaching such a connection or transition point from one side equals the first derivative of the curve approaching the connection from the other side. The curve can also be designed to avoid abrupt and displeasing changes in curvature (which is stepwise defined) or, mathematically, to minimize the maximum value of differences in the curve's second derivative. The curve as thus designed will also lie within the convex hull of the control polygon, be tangent to the originally defined control polygon at its end points and thereby mimic the control polygon to provide a simple and intuitive feel for the designer.

According to one aspect of the present invention, a curve is generated by first defining a polygon, which will be referred to in the following description as an "outbound polygon." The outbound polygon is defined relative to curve end points and at least one control point. Between the end points, the sides of the outbound polygon are defined such that at least two isosceles triangles can, in turn, be defined relative to the outbound polygon, wherein the sides of the isosceles triangles coincide with the sides of the outbound polygon. The isosceles triangles thus defined may be the same size or different sizes. The curve for interconnecting the end points is defined relative to these isosceles triangles. It will be appreciated that the outbound polygon differs from the control polygon discussed above which is described by the end points and control point(s).

By way of example, the case involving two end points and one intermediate control point may be considered (the "control triangle example"). The two end points and the control point form a control polygon, in this case a triangle, which includes a base connecting the end points and two sides, each formed by connecting an end point to the control point. A four sided outbound polygon can be defined relative to these points so as to include: a base which coincides with the control polygon's base; a first side which is collinear with one side of the control polygon; a second side which is collinear with the other side of the control polygon; and a third side connecting the ends of the first and second sides and having a length equal to the sum of the lengths of the first and second sides. In such an outbound polygon, the third side can be segmented at an intermediate point so as to define a first segment adjacent to the first side which is equal in length to the first side and a second segment adjacent to the second side which is equal in length to the second side. Two isosceles triangles are thus defined by the intermediate point and the vertices of the outbound polygon, i.e., a first isosceles triangle composed of the first side, the first segment and a triangle base interconnecting the ends of the two, and a second isosceles triangle composed of the second side, the second segment, and a triangle base interconnecting the ends of the two.

A variety of such outbound polygons can be formed relative to the curve end points and the control point(s). Preferably, the outbound polygon is defined so that the third side, as described in the example above, is parallel to the polygon base. As will be understood upon consideration of the description below, such a polygon yields a curve where abrupt changes in curvature are minimized or eliminated and, therefore, aesthetics are enhanced. Additionally, as set forth in detail below, a method analogous to that of the above described control triangle example can be employed for cases involving more than one control point. This is accomplished, for example, by first dividing the resulting control polygon to form more than one such control triangle, and then employing the described control triangle methodology with respect to each resulting control triangle. Other methods are possible, as discussed below, for addressing the case of more than one control point.

According to another aspect of the present invention, a curve connecting two curve end points is generated by defining a polygon, such as an outbound polygon as previously described, and forming the curve as arc segments fitted to the polygon wherein at least one end of the arc segments is located on a side of the polygon. The process involves selecting a location of at least one control point relative to two curve end points. The polygon is then defined relative to the curve end points and the control point(s). That is, the polygon depends in some manner on this set of points such that a variety of polygons can be achieved corresponding to various arrangements of these points, e.g., the polygon can be varied by moving the control point or points. The arc segments for forming the curve are defined relative to the polygon so that at least one end of the arc segments lies on a side of the polygon apart from the vertices thereof. Preferably, at this one end of the arc segments, the corresponding arc segment(s) is tangent to the side of the polygon.

Referring again to the control triangle example discussed above, a piecewise curve can be generated relative to the outbound polygon as two arc segments. The first arc segment extends from a first of the curve end points to the intermediate point and the second arc segment extends from the intermediate point to the second of the curve end points. Preferably, each arc segment is tangent to the third side of the outbound polygon at the intermediate point. In this manner, smooth conjunction of the arc segments at the connection therebetween is achieved. Additionally, the segments are preferably tangent to the polygon sides at the curve end points. The resulting curve thereby mimics the control polygon to some extent. Moreover, tangency of the curve to the control and outbound polygons at the curve end points facilitates smooth interconnection to further curves, i.e., such smoothness can be achieved by simply causing the control polygons of contiguous curves to have collinear sides at the connection point. Complex, smooth shapes can thereby be generated as a series of individual, smoothly interconnected curves.

In the control triangle example, an arc segment can be defined relative to one of the isosceles triangles as follows. A center of curvature and a radius of curvature are selected so that a circle thereby defined includes a curve end point and the intermediate point of the outbound polygon, i.e., the vertices defining the base of the isosceles triangle. The arc segment will then be that portion of the circle between the curve end point and the intermediate point. To ensure arc segment tangency to the outbound polygon, the center of curvature can be selected as the intersection of a first line perpendicular to the third side passing through the intermediate point, and a second line perpendicular to the outbound polygon side including the curve end point and passing through the curve end point. The circle drawn relative to this center of curvature will have a radius equal to the distance from the center of curvature to either of the intermediate point or the curve end point.

In one embodiment, the method of the present invention is used to operate a curve forming device to form a smooth, complex curve, i.e., a piecewise curve formed of arc segments of different curvature having a smooth connection between adjacent segments. The curve forming device is limited, e.g., due to the control system or control language employed, to forming shapes composed of segments selected from a set of geometric elements such as lines, corners and circular arcs. Examples of the types of curve forming devices which can be employed include plotters, milling machines, cutting machines, ink jet or robotic painting units for forming defined shapes, etc. According to the method, a control system having a visual interface is employed to obtain guidance information relative to end points and at least one control point for defining the curve. For example, a mouse, keyboard or other input device associated with a computer can be used to input coordinate information relative to the points, which coordinate information is then reflected on a computer monitor to provide a visual interface.

A smooth, complex curve composed of geometric elements selected from the element set of the curve forming device is then directly derived as a function of the end points and control point(s). This can be accomplished, for example, by using an outbound polygon or polygon side/arc fitting method as described above. The control system is interfaced with a curve forming device, e.g., via software for expressing information regarding the defined curve into a standard operating language format and/or appropriate linking hardware, so as to communicate guidance information to the curve forming device. The guidance information is employed by the curve forming device to form the desired smooth, complex curve. In this regard, the curve forming device may employ additional information, such as information relating to cutting tool offsets due to the swath of the tool, in conjunction with the guidance information for forming the curve.

It is an advantage of the present invention that curves are generated that can be directly implemented by conventional curve forming devices. It is a further advantage of the present invention that smooth, complex curves can be generated quickly and easily without requiring undue processing resources.

BRIEF DESCRIPTION OF THE DRAWINGS

For a more complete understanding of the present invention and further advantages thereof, reference is now made to the following Detailed Description taken in conjunction with the drawings, in which.

DETAILED DESCRIPTION OF THE PREFERRED EMBODIMENT

The present invention discloses a method for generating curves which is particularly apt for use in connection with interfacing and operating curve forming devices. The present invention is described herein with respect to one such application; namely, operating a CNC machine tool for cutting a design from a workpiece. However, it should be appreciated that the curve generating method and design tool of the present invention is not limited to any such particular application.

Figure 1:
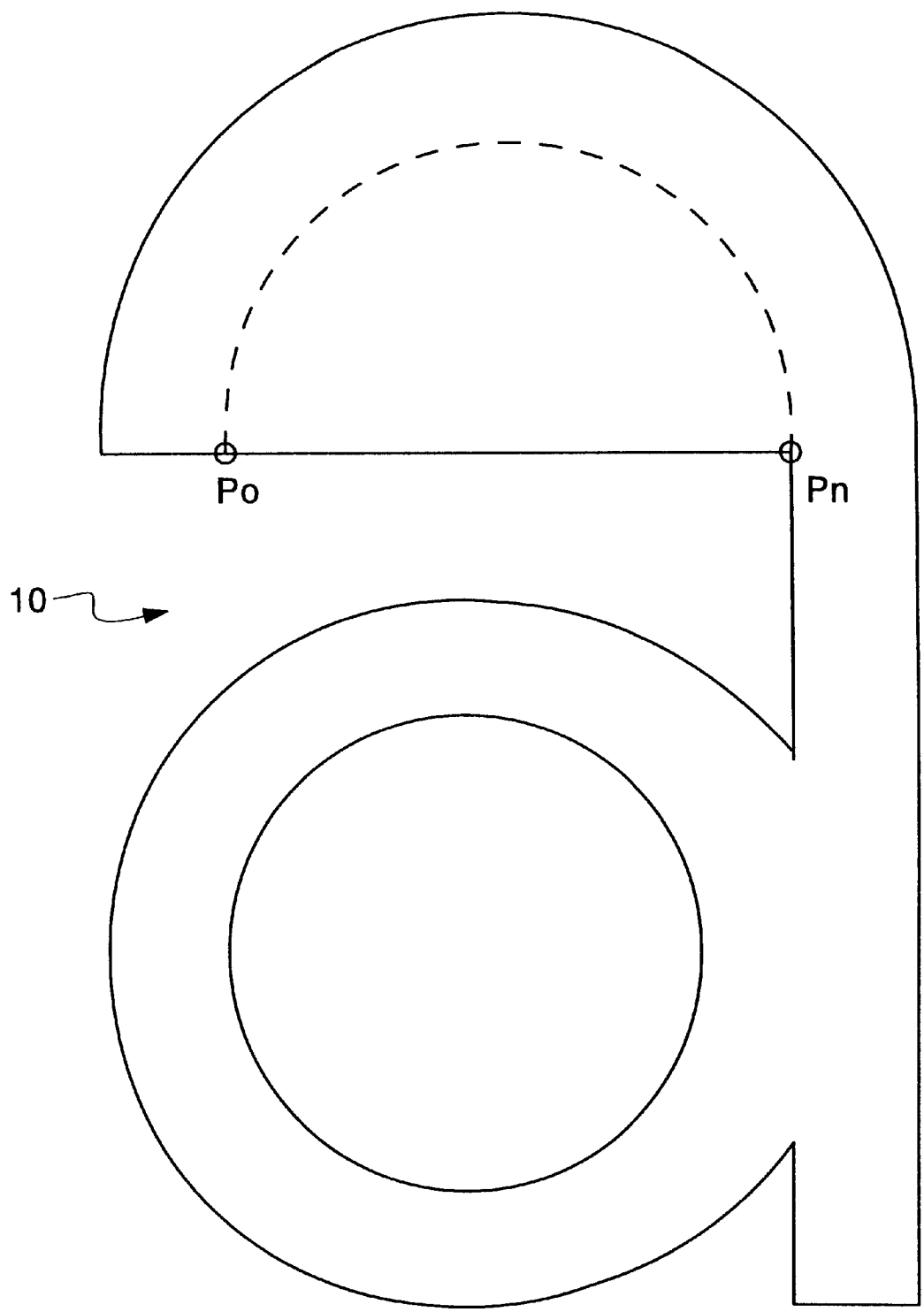
FIG. 1 illustrates a desired design.

Referring to FIG. 1, a partially completed design 10 is shown. In this case, the design 10 is an outline for the letter "a" in a custom or standard font. As will be appreciated from the description below, the present invention allows for substantially real time computer aided design. Accordingly, the design 10 may be displayed on a computer monitor.

It may be desired to produce such a design in connection with a variety of applications including plotting, image coding, printing, driving a CNC machine or other CAD/CAM applications. For purposes of the present description, the design 10 can be considered as defining cut boundaries for driving a machine cutting tool. For example, the tool can be used to cut a base or face plate of a letter shaped housing as is commonly employed for housing neon tubes in connection with neon signs. In such an application, it is desirable for the plate shape to be closely controlled so as to substantially match the shape of a corresponding side panel.

As shown in FIG. 1, for purposes of illustration, the solid lines represent the partially completed design 10 and the phantom lines represent the desired final design. Accordingly, it is desired to define an appropriate curve connecting end points $P_0$, $P_n$ so as to complete the design, and thereby allow for generation of appropriate machine tool guidance information. As should be appreciated, the present invention would be employed to generate all curves in the intended design 10.

Design Objectives

In a preferred implementation of the curve generating method of the present invention, a number of design objectives are taken into consideration. First, it is desirable to construct the curve from segments composed of geometric elements which can be directly implemented by a curve forming device. As previously noted, many numerical control languages used in operating curve forming devices utilize only line and circular arc oriented commands. Accordingly, in the preferred implementation of the present invention, the circular arc is taken as the basic constructive unit. The designed curve will thus comprise a piecewise curve of contiguous arc segments. In vector form, the circular arc is given by the equation:

$$c(\alpha) = a + r \cdot e^{j\psi} \quad (1)$$

where $a = (a_x, a_y)$ is a center of the arc, r is its radius and $\psi$ is an angular parameter of the arc: $\psi_o \leq \psi \leq \psi_n$ As a second preferred design objective, it is desired, for aesthetic and practical reasons, that the piecewise curve be smooth at all points, including at the connections between contiguous segments. In this regard, a piecewise curve of n segments can be defined as a continuous function of a parameter $\psi$ ($\psi_o \leq \psi \leq \psi_n$) as follows:

$$c^n(\varphi) = \sum_{k=1}^{n} f_k(\varphi) \cdot (a^k + r_k \cdot e^{j\varphi}) \quad (2)$$

where $f_k = 1$ for $\psi_{k-1} < \psi < \psi_k$ and $f_k = 0$ otherwise ($\psi < \psi_1 < \ldots \psi_k < \psi_n$).

Mathematically, the requirement of continuity at the connections between segments can then be expressed as:

$$\frac{d}{d\varphi} c^n(\varphi_{k+}) = \frac{d}{d\varphi} c^n(\varphi_{k-}) \quad (3)$$

for all k=1, 2, . . . , n. The subscripts + and − indicate the derivative values approaching a given point from the right and left respectively. Abrupt changes in curvature can be reduced or eliminated and enhanced aesthetics can be achieved by minimizing the maximum value of the second derivative deviation over the extent of the curve.

Figure 2:
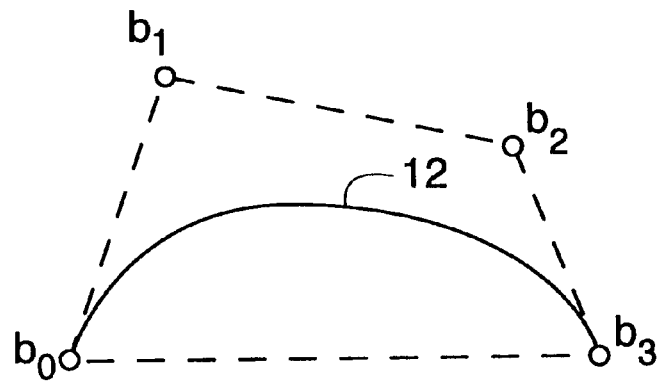
FIG. 2 illustrates a curve generated in accordance with the present invention in relation to a control polygon.

A further preferred design objective is to allow the designer to quickly and conveniently select or modify a curve in a manner which provides an intuitive appeal. Conveniently, the design process can be initiated by inputting design information in the form of curve end points and one or more control points, or otherwise defining a control polygon, using a mouse or other input mechanism. Referring to FIG. 2, an example employing two control points $b_1$ and $b_2$ in conjunction with curve end points $b_0$ and $b_3$ is shown. To provide the desired intuitive appeal, the designed curve 12 preferably has the following characteristics relative to the input information. First, the curve 12 preferably passes through curve end points $b_0$ and $b_3$ to allow for positive definition of the curve limits. Second, the curve 12 is preferably tangent to the control handles, i.e., the line segments $b_0$, $b_1$ and $b_2$, $b_3$, at the curve end points $b_0$ and $b_3$. Third, the curve 12 preferably lies within the convex hull (the shape defined by segments $b_0$, $b_1$; $b_1$, $b_2$; and $b_2$, $b_3$) of the control polygon defined by points $b_0$, $b_1$, $b_2$ and $b_3$. The curve 12 thus mimics the control polygon to provide an intuitive design feel.

The preferred design objective operates equally with either 2 dimensional or 3 dimensional curves and forming devices, thus allowing for the control handles to be either 2D or 3D vectors.

Generating the Curve

These design objectives can be addressed according to the present invention by generating a curve based on an outbound polygon. As will be understood upon consideration of the following description, the outbound polygon, which is derived from the curve end points and control point or points, lies outbound of the defined curve and, more specifically, circumscribes the defined curve. Thus, in the preferred implementation of the invention, the method for forming a curve generally involves defining an outbound polygon and generating the curve based on the outbound polygon. For illustration purposes, the method will first be described with respect to the case of a single control point and then generalized for the case of more than one control point.

Figure 3:
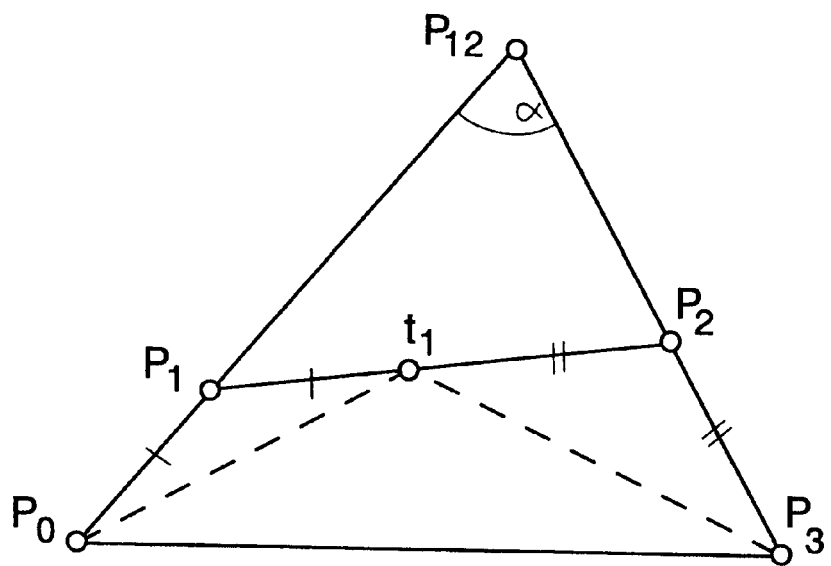
FIG. 3 illustrates a control polygon and an outbound polygon in accordance with the present invention.

Referring to FIG. 3, a control polygon, in this case a triangle, defined by end points $p_0$, $p_3$ and control point $p_{12}$ is shown. An outbound polygon $p_0$, $p_1$, $p_2$, and $p_3$, is defined relative to points $p_0$, $p_{12}$, $p_3$ as follows. The base of the outbound polygon is defined by end points $p_0$ and $p_3$. The sides of the outbound polygon are then defined to simultaneously satisfy the following conditions. A first side $p_0$, $p_1$ of the outbound polygon is defined such that it is collinear with side $p_0$, $p_{12}$ of the control polygon. A second side $p_2$, $p_3$ of the outbound polygon is defined such that it is collinear with side $p_{12}$, $p_3$ of the control polygon. The remaining third side $p_1$, $p_2$ of the outbound polygon is defined such that it connects the polygon vertices at $p_1$, and $p_2$, wherein the length of side $p_1$, $p_2$ (designated $\|p_1, p_2\|$) is equal to the sum of the lengths of sides $p_0$, $p_1$ and $p_2$, $p_3$, i.e., $\|p_1, p_2\| = \|p_0, p_1\| + \|p_2, p_3\|$.

A point $t_1$, can thus be defined on side $p_1$, $p_2$ such that the following conditions are satisfied:

$$\|p_0, p_1\| = \|p_1, t_1\| \text{ and}$$

$$\|t_1, p_2\| = \|p_2, p_3\|$$

Stated differently, $t_1$ in conjunction with the vertices of the outbound polygon define two isosceles triangles; namely $p_0$, $p_1$, $t_1$ and $t_1$, $p_2$, $p_3$, where the equal length sides of the isosceles triangles coincide with the sides of the outbound polygon.

It is an intrinsic property of the outbound polygon that a number of possible line segments $p_1$, $p_2$ exist which satisfy the conditions stated above. These possible line segments can be defined relative to the determination of $\overline{X} = \|p_2, p_3\|$, using $l = \|p_1, p_{12}\|$ as a parameter as follows:

$$x = \frac{L(L-2l)}{2(l - l(1 + \cos\alpha))},$$

where $L = \|p_0, p_{12}\| + \|p_3, p_{12}\|$. FIG. 3 represents a general case.

Figure 4:
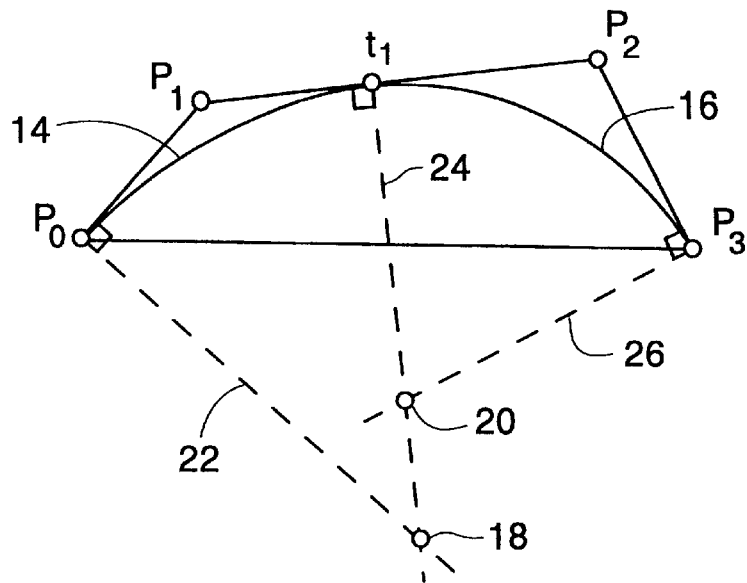
FIG. 4 illustrates a method for generating a curve relative to the outbound polygon of FIG. 3.

Referring to FIG. 4, once the outbound polygon $p_0$, $p_1$, $p_2$, $p_3$ is thus defined, it is possible to construct a continuous curve connecting end point $p_0$ and $p_3$ which is tangent to side $p_0$, $p_1$ at $p_0$, tangent to side $p_2$, $p_3$ at $p_3$ and tangent to $p_1$, $p_2$ at $t_1$. As illustrated, this curve is composed of a first circular arc segment 14 connecting $p_0$ and $t_1$ and a second circular arc segment 16 connecting $t_1$ and $p_3$. Defining these arc segments 14 and 16 involves determining a center of curvature and a radius for each segment. The centers of curvature 18 and 20 for the arc segments 14 and 16, respectively, can be defined relative to line 22, which is perpendicular to side $p_0$, $p_1$ and passes through $p_0$, line 24, which is perpendicular to side $p_1$, $p_2$ and passes through point $t_1$, and line 26, which is perpendicular to side $p_2$, $p_3$ and passes through point $p_3$. Centers of curvature 18 and 20 are thus defined by the intersections of line 22 and 24 and of lines 24 and 26, respectively. The radius of arc segment 14 can be calculated as the distance from center of curvature 18 to either $p_0$ or $t_1$. Similarly, the radius of arc segment 16 can be calculated as the distance from center of curvature 20 to either point $t_1$ or $p_3$.

From the foregoing, it will be appreciated that the resulting curve, composed of segments 14 and 16 is tangent to the handles $p_0$, $p_{12}$ and $p_3$, $p_{12}$ at the curve end points $p_0$ and $p_3$ in accordance with the stated design objective. In addition, cotangency of the arc segments 14 and 16 at the connection point $t_1$, and, hence, smoothness of the curve, is ensured due to the tangency of each arc segment 14 and 16 individually, to side $p_1$, $p_2$ at $t_1$. The resulting curve is thus circumscribed by the outbound polygon, contacts the outbound polygon at the three points $p_1$, $t_1$ and $p_3$ and lies within the convex hulls of both the outbound polygon and the control polygon.

Figure 5:
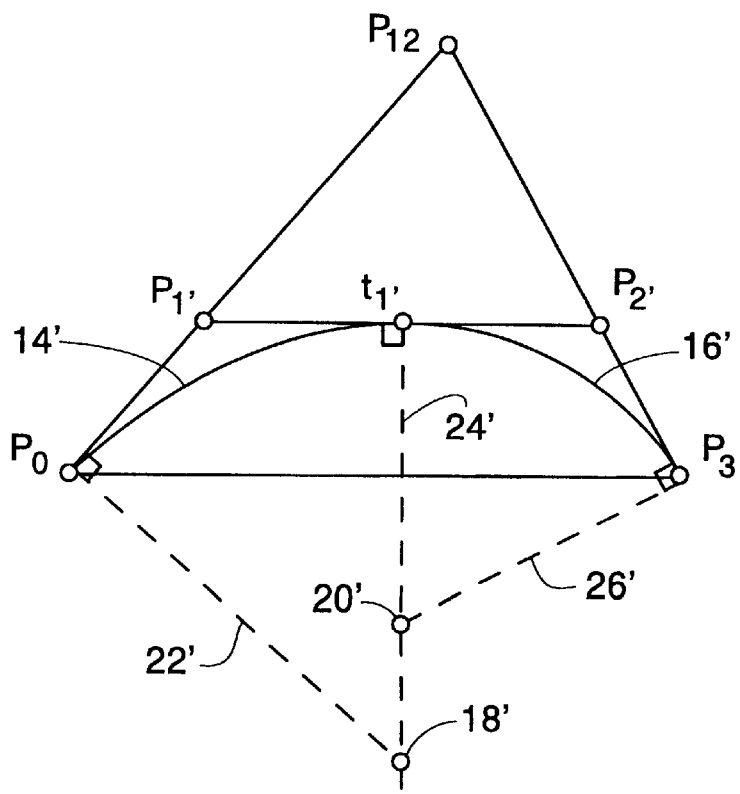
FIG. 5 illustrates another method for generating a curve according to the present invention.

FIG. 5 illustrates a special case of the previously mentioned number of possible third sides, i.e., side $p_1'$, $p_2'$, and the resulting outbound polygon. In this case side $p_1'$, $p_2'$ is defined so as to be parallel to base $p_0$, $p_3$ in addition to satisfying the outbound polygon characteristics noted above. In this regard, the location S of side $p_1'$, $p_2'$ relative to control polygon $p_0$, $p_{12}$ and $p_3$ can be determined as:

$$S = \frac{\|p_0, p_{12}\| + \|p_3, p_{12}\|}{\|p_0, p_{12}\| + \|p_3, p_{12}\| + \|p_0, p_3\|}$$

Using the ratio S, points $p_1'$ and $p_2'$ can be thus determined as $p_1' = p_0 + S(p_{12} - p_0)$ and $p_2' = p_3 + S(p_{12} - p_3)$.

Arc segments 14' and 16' can then be produced using the same method as described above. That is, center of curvature 18' is defined as the intersection of line 22' drawn perpendicularly to side $p_0$, $p_1'$ at $p_0$ and line 24' drawn perpendicularly to side $p_1'$, $p_2'$ at $t_1$, and center of curvature 20' is defined as the intersection of line 24' and line 26' drawn perpendicularly to side $p_2'$, $p_3$ at $p_3$. This special case of side $p_1'$, $p_2'$ and the corresponding outbound polygon has the advantage of providing minimal curvature deviation as between the resulting arc segments 14' and 16', thereby satisfying another stated design objective.

Having thus described the method for generating curves of the present invention with respect to the basic case of a single control point, the method will now be generalized with regard to the use of more than one control point, e.g., two control points. Two such methods will be described as exemplary of the many possibilities. Each of these methods is generically applicable to cases involving more than two control points.

Figure 6:
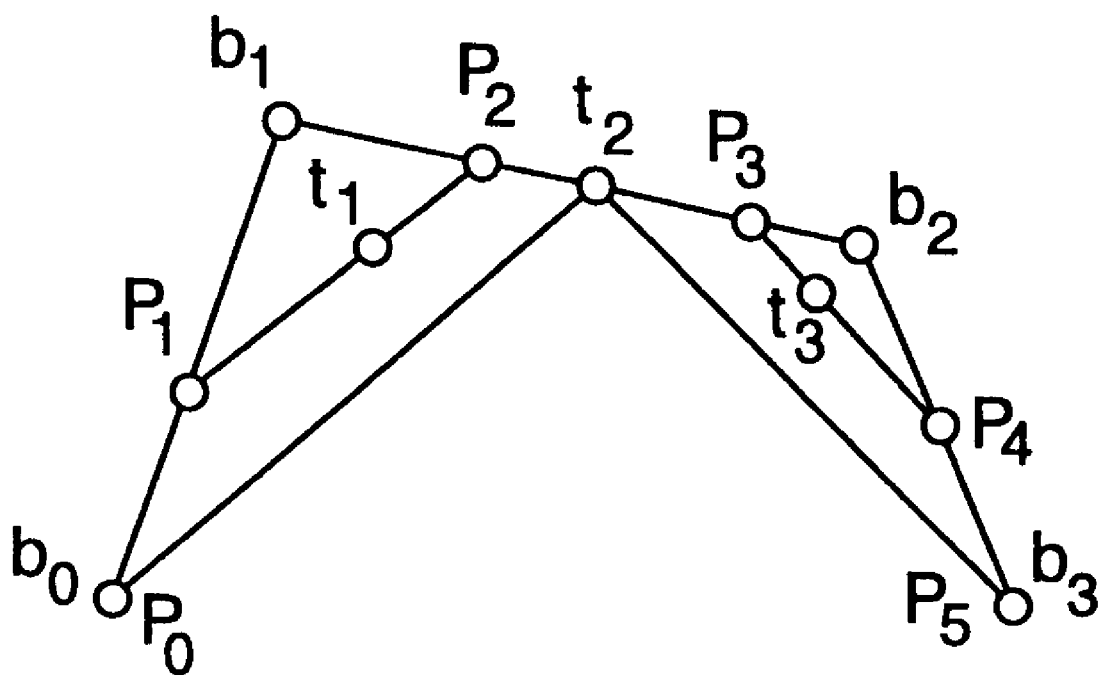
FIG. 6–8 illustrate a further method for generating a curve according to the present invention.
Figure 7:
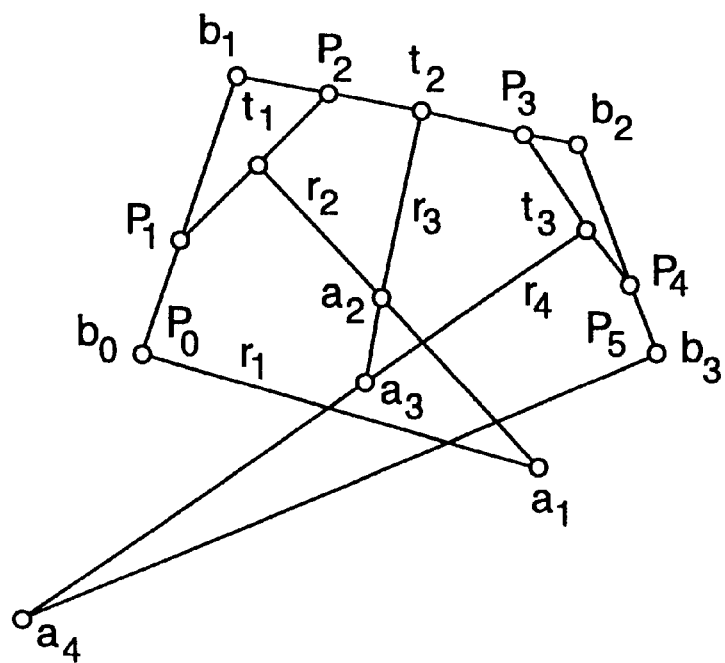
Figure 8:
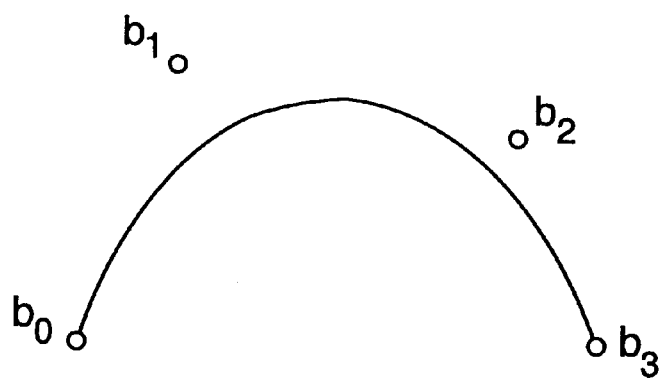

Referring to FIGS. 6–8, a first method for addressing the two control point case is described by reference to a control polygon defined by curve end points $b_0$ and $b_3$ and control points $b_1$, $b_2$. According to this method, a point $t_2$ on side $b_1$, $b_2$ is first selected as shown in FIG. 6, e.g., in such a way that side $b_1$, $b_2$ is divided proportionally to the lengths of the adjacent sides of the control polygon. Lines can then be drawn from each of the end points $b_0$ and $b_3$ to point $t_2$, thereby dividing control polygon $b_0$, $b_1$, $b_2$, $b_3$ into two triangles $b_0$, $b_1$, $t_2$, and $t_2$, $b_2$, $b_3$. The previously described methodology can then be employed to define an outbound polygon for each of the resulting triangles, i.e., outbound polygons $p_0$, $p_1$, $p_2$, $t_2$ and $t_2$, $p_3$, $p_4$, $p_5$, thereby defining overall outbound polygon $p_0$, $p_1$, $p_2$, $p_3$, $p_4$, $p_5$. Points $t_1$ and $t_3$ can then be defined, as previously described, on sides $p_1$, $p_2$ and $p_3$, $p_4$, respectively, thereby defining a series of isosceles triangles: $p_0$, $p_1$, $t_1$; $t_1$, $p_2$, $t_2$; $t_2$, $p_3$, $t_3$; and $t_3$, $p_4$, $p_5$.

Referring to FIG. 7, centers of curvature and radii can be determined as described above for four arc segments which collectively form a curve connecting curve end points $b_0$ and $b_3$. Specifically, a first arc segment connecting points $p_0$ and $t_1$ is defined by center of curvature $a_1$ and radius $r_1$; a second arc segment connecting points $t_1$ and $t_2$ is defined by center of curvature $a_2$ and radius $r_2$; a third arc segment connecting points $t_2$ and $t_3$ is defined by center of curvature $a_3$ and radius $r_3$; and a fourth arc segment connecting points $t_3$ and $p_5$ is defined by center of curvature $a_4$ and radius $r_4$. As shown in FIG. 8, these arc segments thus form a continuous curve 28 connecting end points $b_0$ and $b_3$ which generally mimics the original control polygon $b_0$, $b_1$, $b_2$, $b_3$. It will be appreciated that for cases involving more than two control points, the control polygon can similarly be divided into a number of triangles which, in turn, can be used to define corresponding outbound polygons.

Figure 9:
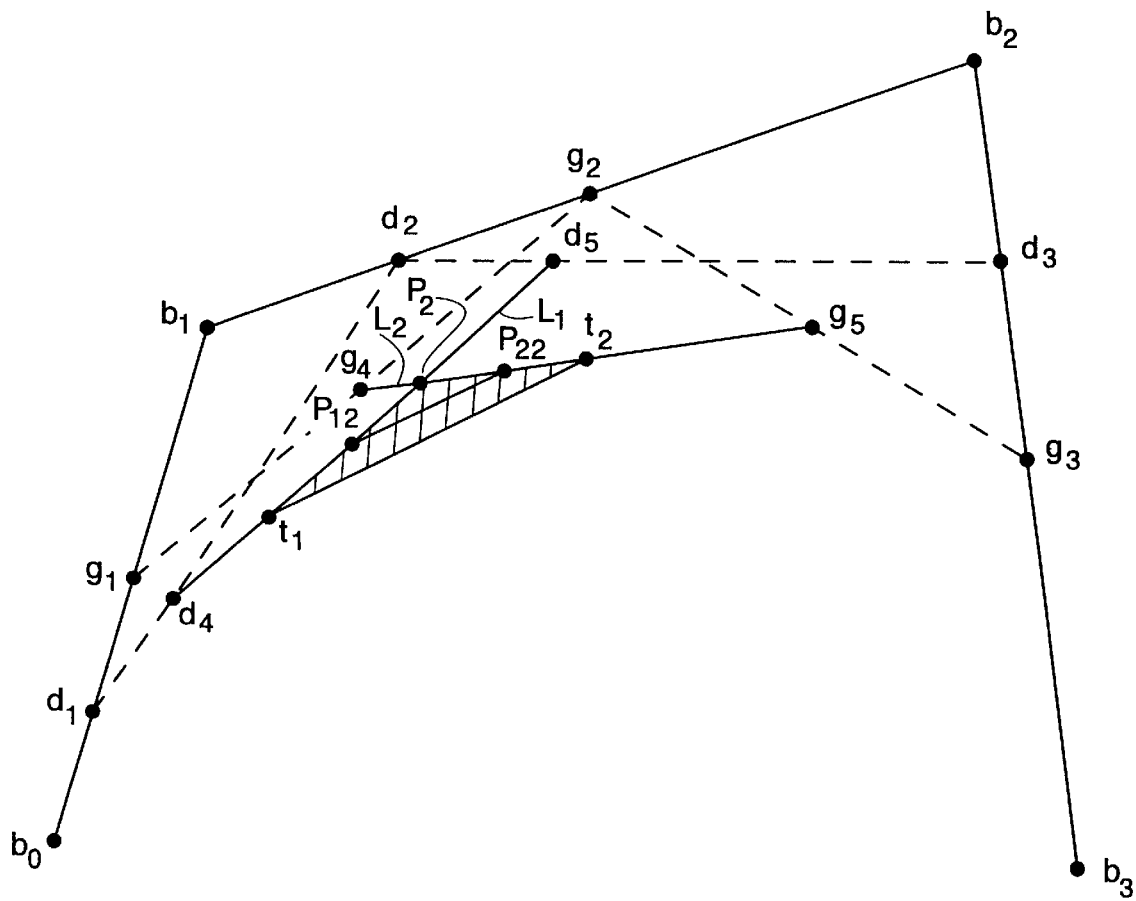
FIG. 9 illustrates a still further method for generating a curve according to the present invention.

Referring to FIG. 9, a second method for addressing the case of more than one control point is illustrated. For a given control polygon, this method generates a family of curves of different orders, i.e., wherein the associated outbound polygon has different number of sides and, consequently, the curve is formed from a different number of arc segments. As the order of the curve is increased (the number of segments used to form the curve is increased), the curve converges on a Bezier curve defined by the same control polygon. Additionally, the resulting curve automatically provides the minimal divergence of curvature as between the arc segments forming the curve.

The family of curves is parameterized with an integer parameter n (n=2, 3, . . . ) which defines the curve order. For each interval i (wherein i=1, 2, . . . , n) the parameters $s=(i-1)/n$ and $q=i/n$ are defined and two lines are constructed. These two lines are used to define two segments of the outbound polygon sides. By repeating this process for i=1, 2 . . . n, the complete outbound polygon is constructed.

As shown in FIG. 9, the geometric construction for the case of n=4 and i=2 is shown for purposes of illustration. A first line and outbound polygon segment end point are determined by:

1) defining point $d_1$ by dividing side $b_0$, $b_1$ by factor s such as $d_1 = b_0 + s (b_1 - b_0)$;
2) defining point $d_2$ by dividing side $b_1$, $b_2$ by factor s such as $d_2 = b_1 + s (b_2 - b_1)$;
3) defining point $d_3$ by dividing side $b_2$, $b_3$ by factor s such as $d_3 = b_2 + s (b_3 - b_2)$;
4) defining point $d_4$ by dividing $d_1$, $d_2$ by factor s such as $d_4 = d_1 + s (d_2 - d_1)$;
5) defining point $d_5$ by dividing $d_2$, $d_3$ by factor s such as $d_5 = d_2 + s (d_3 - d_2)$
6) drawing line 1, $L_1$, by connecting points $d_4$ and $d_5$; and
7) defining segment end point $t_1$ by dividing $d_4$, $d_5$ by factor s such as $t_0 = d_4 + s(d_5 - d_4)$ A second line and outbound polygon segment end point are determined by:

1) defining point $g_1$ by dividing side $b_0$, $b_1$ by factor q such as $g_1 = b_0 + q(b_1 - b_0)$;
2) defining point $g_2$ by dividing side $b_1$, $b_2$ by factor q such as $g_2 = b_1 + q(b_2 - b_1)$;
3) defining point $g_3$ by dividing side $b_2$, $b_3$ by factor q such as $g_3 = b_2 + q(b_3 - b_2)$;
4) defining point $g_4$ by dividing side $g_1$, $g_2$ by factor q such as $g_4 = g_1 + q(g_2 - g_1)$;
5) defining point $g_5$ by dividing side $g_2$, $g_3$ by factor q such as $g_5 = g_2 + q(g_3 - g_2)$;
6) connecting points $g_4$ and $g_5$ to form line 2, $L_2$; and
7) defining segment end point $t_2$ by dividing $g_4$, $g_5$, by factor q such as $t_2 = g_4 = q(g_5 - g_4)$.

Lines $L_1$ and $L_2$ are then intersected at $p_2$ so as to define shaded triangle $t_1$, $p_2$, $t_2$ and outbound polygon segments $t_1$, $p_{12}$ and $p_{22}$, $t_2$. By repeating this process for each of i=1,2 . . . n, a complete outbound polygon is constructed. Finally, the curve is generated relative to the completed outbound polygon as previously described. It will be appreciated that this technique can be employed for any number of control points.

The above described technique is used, as is, if the ending and control points ($b_0$, $b_1$ $b_2$, $b_3$) are positioned in 2 dimensional space. If 3 dimensional ending points $B_0$ (x,y,z), $B_3$ (x,y,z) and control points $B_1$ (x,y,z), $B_2$ (x,y,z) are given, the above described technique can be utilized to generate a 3 dimensional curve, without any changes of the technique itself, provided certain preprocessing operations are implemented.

Figure 13:
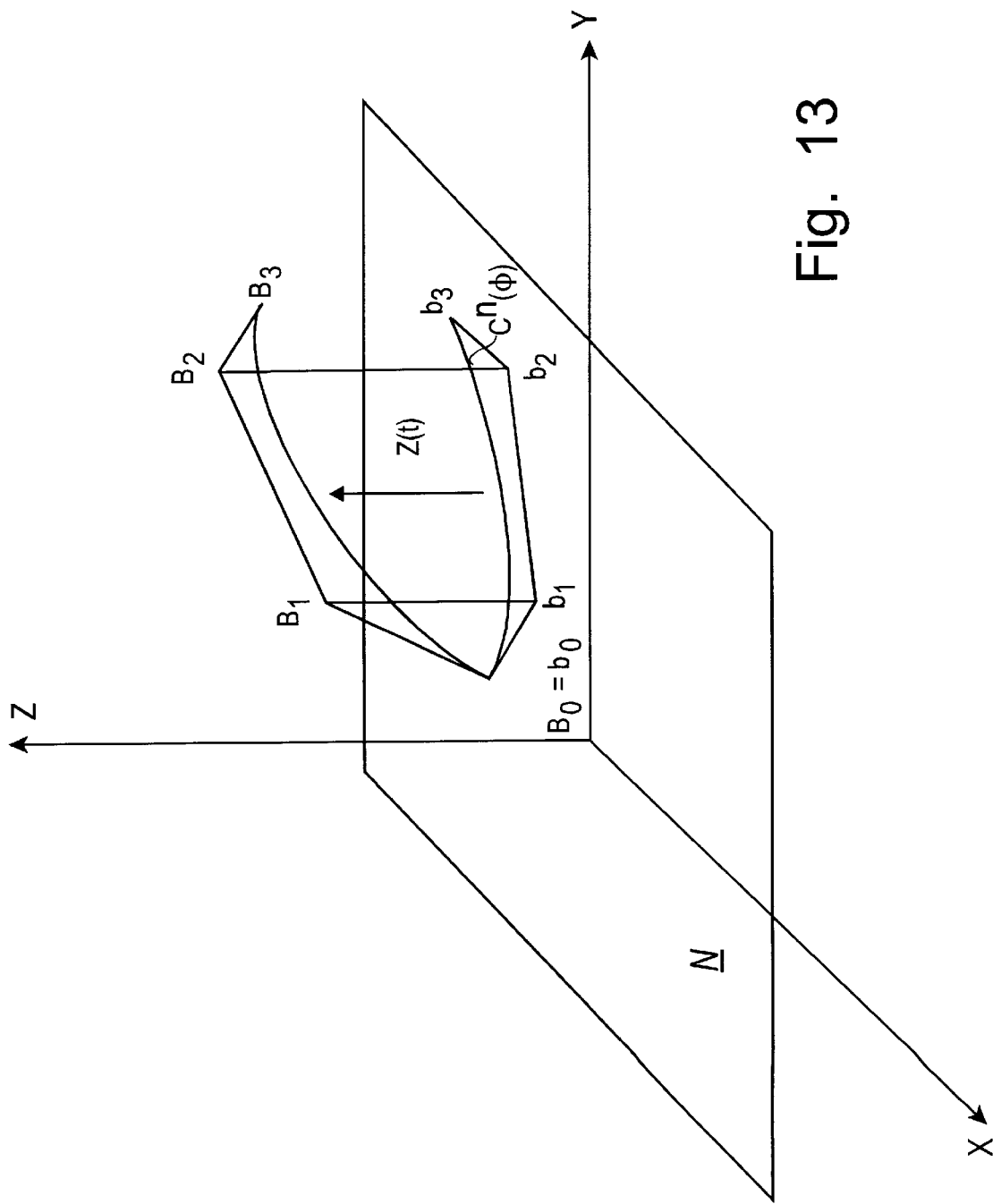
FIG. 13 illustrates a further method for generating a curve according to the present invention.

The preprocessing steps, illustrated in FIG. 13, are the following:

1. Select any plane N parallel to one of the coordinate planes, say (X,Y), passing through one of the ending points, say $B_0$.
2. Find points $b_0$, $b_1$, $b_2$, $b_3$ as projections of given ending points $B_0$, $B_3$ and control points $B_1$, $B_2$ onto the plane N (one of the ending points, say $b_0 = B_0$, belong to N and does not need to be projected).

The technique above now is to be used for constructing the curve $c^n$ ($\phi$) ($\phi_0 <= \phi <= \phi_n$) (eq. 2) lying on the plane N with given points $b_0$, $b_3$, $b_1$, $b_2$.

Operating the Curve Forming Device

The curve generated as described above is composed of circular arc segments and is therefore amenable to implementation by curve forming devices employing conventional control languages which understand only arc and line oriented commands. Accordingly, it is unnecessary to translate the curve into a form amenable for such implementation. Rather, the curve data can be directly converted to a CAD/CAM standard format and downloaded to the controller of curve forming device.

In the plate cutting embodiment of the present invention, the design data, which is ordinarily comprised of a series of interconnected curves, is provided to the controller of a CNC cutting machine. The machine then cuts the appropriate shape based on the design data in conventional fashion, with appropriate provisions made for offsets due to cutting swath and the like.

Figure 10:
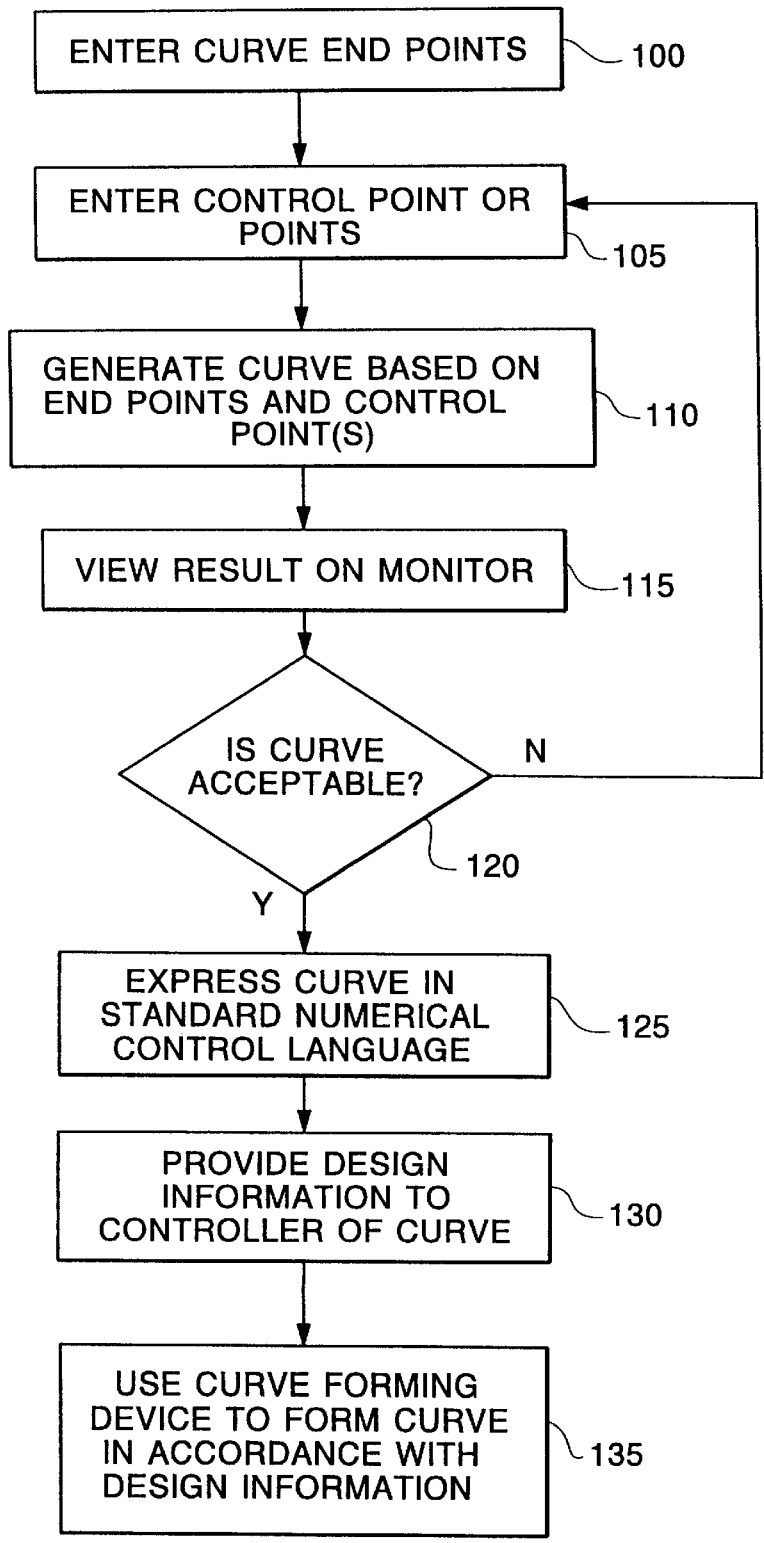
FIG. 10 is a flowchart of a method for operating a curve forming device according to the present invention.
Figure 11:
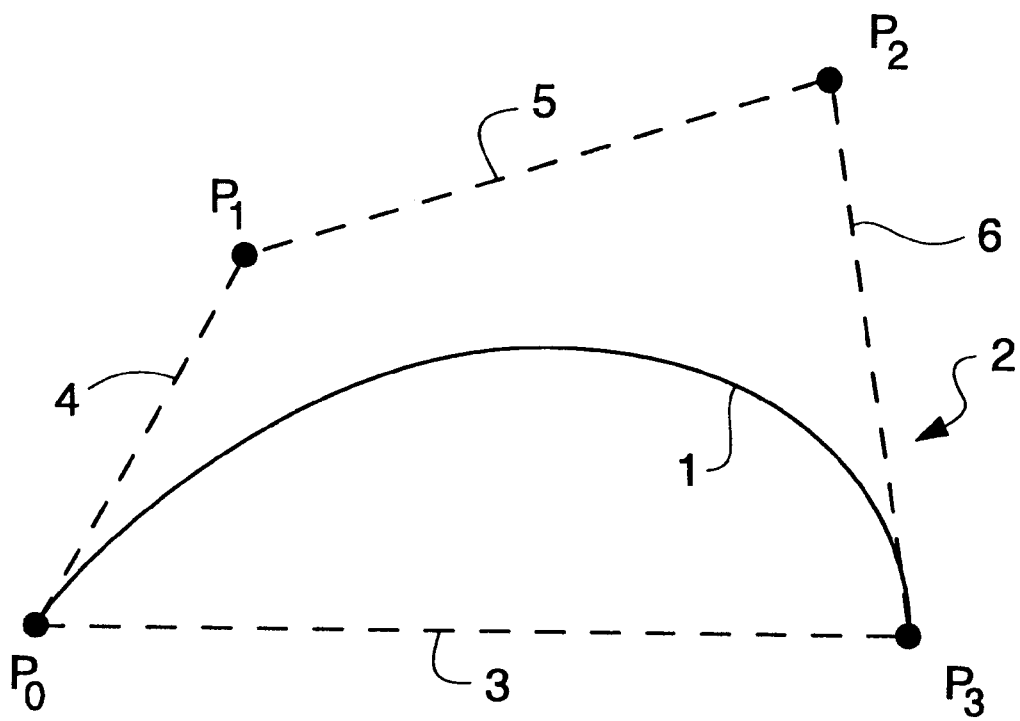
FIG. 11 illustrates a prior art curve generating method.

FIG. 10 shows a flow chart of a method for operating a curve forming device according to the present invention. The method is initiated in step 100 by selecting end points for the curve. Where the curve forms a portion of an overall design (see FIG. 1), the end points may be determined by adjacent design portions. In step 105, one or more control points are entered thereby defining a control polygon. Because the resulting curve mimics the control polygon to some extent, an experienced designer will acquire an intuitive feel for positioning the control points. A curve generating method as described above is employed in step 110 to generate a curve based on the end points and the control point(s).

The designer can then view the resulting curve on a computer monitor (step 115) and determine whether the curve is acceptable (step 120) based on predetermined design considerations. As indicated in FIG. 10, the control points can be repositioned if the curve is unacceptable. It will be appreciated that, assuming adequate processing speed, this feedback process can be accomplished substantially instantaneously, for convenient iterative and interactive design definition. Once an acceptable curve is achieved, in step 125 the curve is expressed in a standard numerical control language, such as DXF, TIFF, EIA, HP-GL or IGES, using known techniques. Corresponding design information is then provided to the controller of a curve forming device such as an NC cutting machine in step 130. Finally, in step 135, the curve forming device is operated to form the curve based on the design information.

For operating the 3 dimensional forming device, the 2 dimensional curve is located within a plane N (see Section "Generating the Curve" and FIG. 13). While issuing circular arcs commands for any two axes of the plane N, say X and Y, in accordance with the function $c''(\phi)$ ($\phi_0 <= \phi <= \phi_n$), another motion, say along the axis Z, is to be set with the following equation:

$$Z(t) = P_0(t)*Z_0 + P_1(t)*Z_1 + P_2(t)*Z_2 + P_3(t)*Z_3, \quad (3)$$

where $Z_0, Z_1, Z_2, Z_3$ are Z-coordinates of the ending and control points $B_0$, $B_1$ $B_2$, $B_3$, respectively, and $t = \phi/(\phi_n - \phi_0)$, thus $0 <= t <= 1$.

$P_0(t)$, $P_1(t)$, $P_2(t)$, $P_3(t)$ are any polynomials allowing $Z(t)$ to satisfy the conditions:

$$Z(0)=Z_0,\ Z(1)=Z_3,\ Z'(0)=Z_1-Z_0,\ Z'(1)=Z_3-Z_2$$

Such polynomials can be, say, Bernstein polynomials which are:

$$P_0(t)=(1-t)^3,\ P_1(t)=t*(1-t)^2,\ P_2(t)=t^2*(1-t),\ P_3(t)=t^3$$

FIGS. 12a–12f show the results of curve production using a known technique and using the present invention. All of the Figures were produced using MICROSOFT WORD 6.0.

Figure 12A:
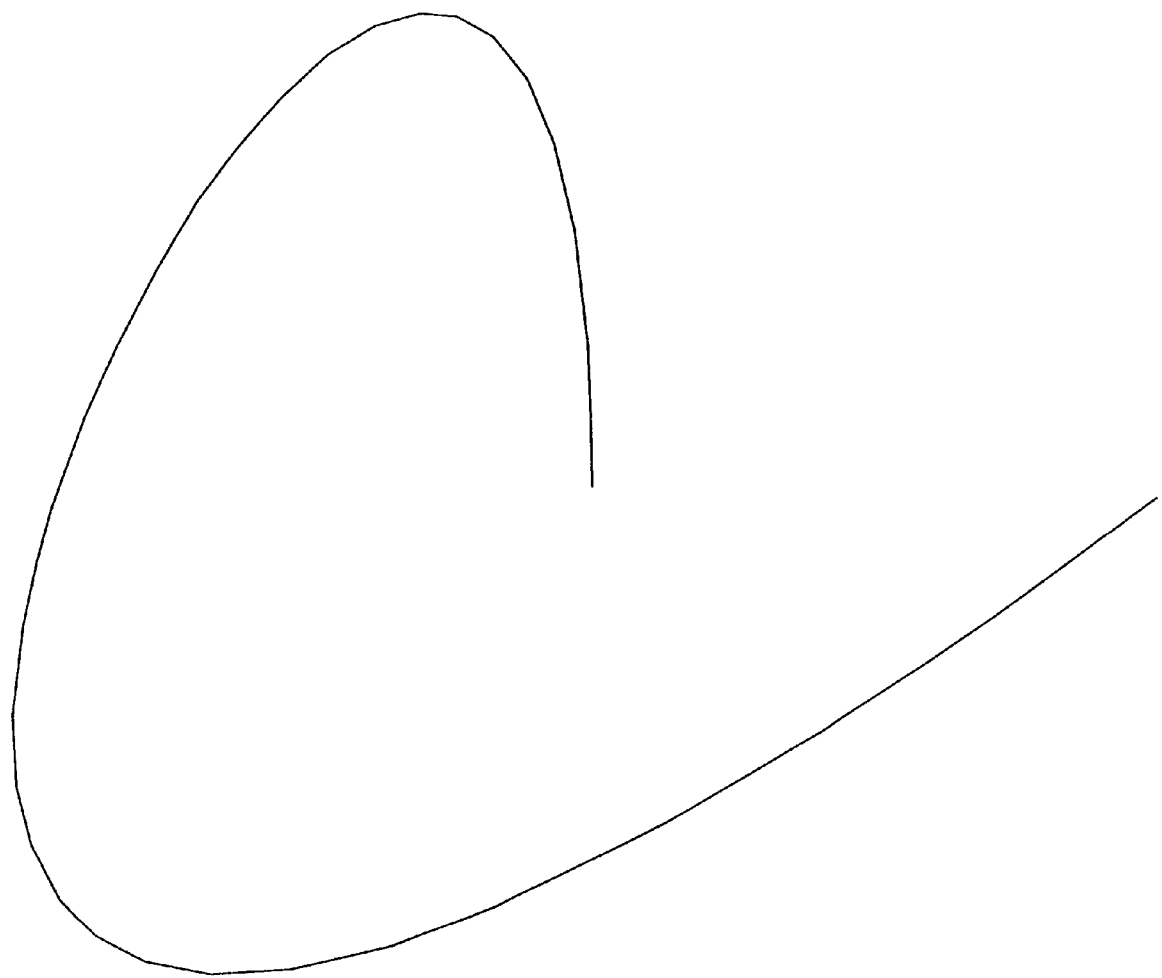
FIGS. 12a–12f show curves generated in accordance with a known method and in accordance with the present invention.
Figure 12B:
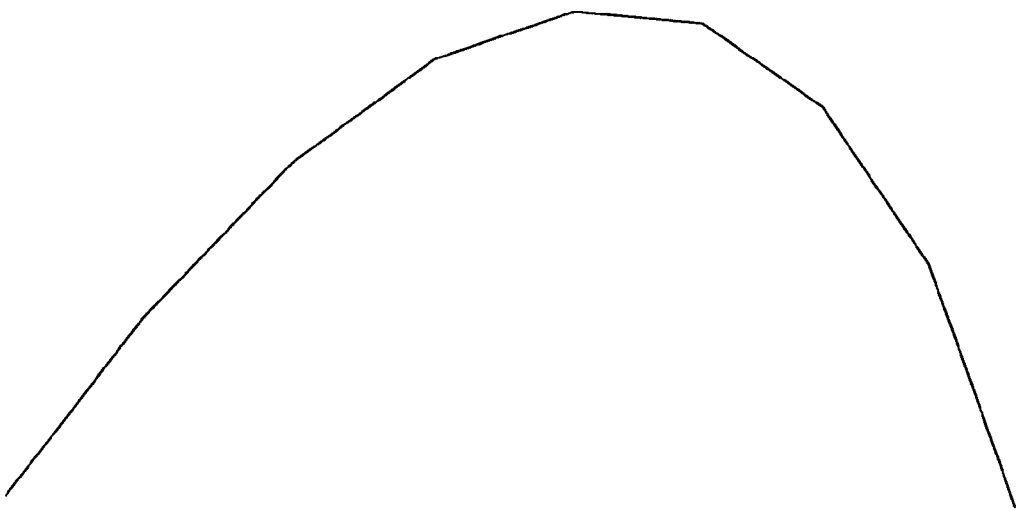

FIGS. 12a and 12b illustrates a curve produced using the commercially available CORELDRAW product. This product allows for curve derivation using a Bezier curve technique and subsequent translation into a standard operating language format for CAD/CAM applications. The illustrated curve is a piecewise line segment approximation of a Bezier curve translated to DXF format as is common for operating CNC machines and graphic devices. In this illustrated example, the translated of FIG. 12a curve is composed of 32 line segments and therefore requires a relatively large number of control commands for implementation. FIG. 12b shows a portion of the curve of FIG. 12a magnified by a factor of 6 and includes 8 line segments. As is apparent, despite the relatively large number of segments employed, the resulting curve is not smooth. This curve production technique can therefore be problematic for certain applications.

Figure 12C:
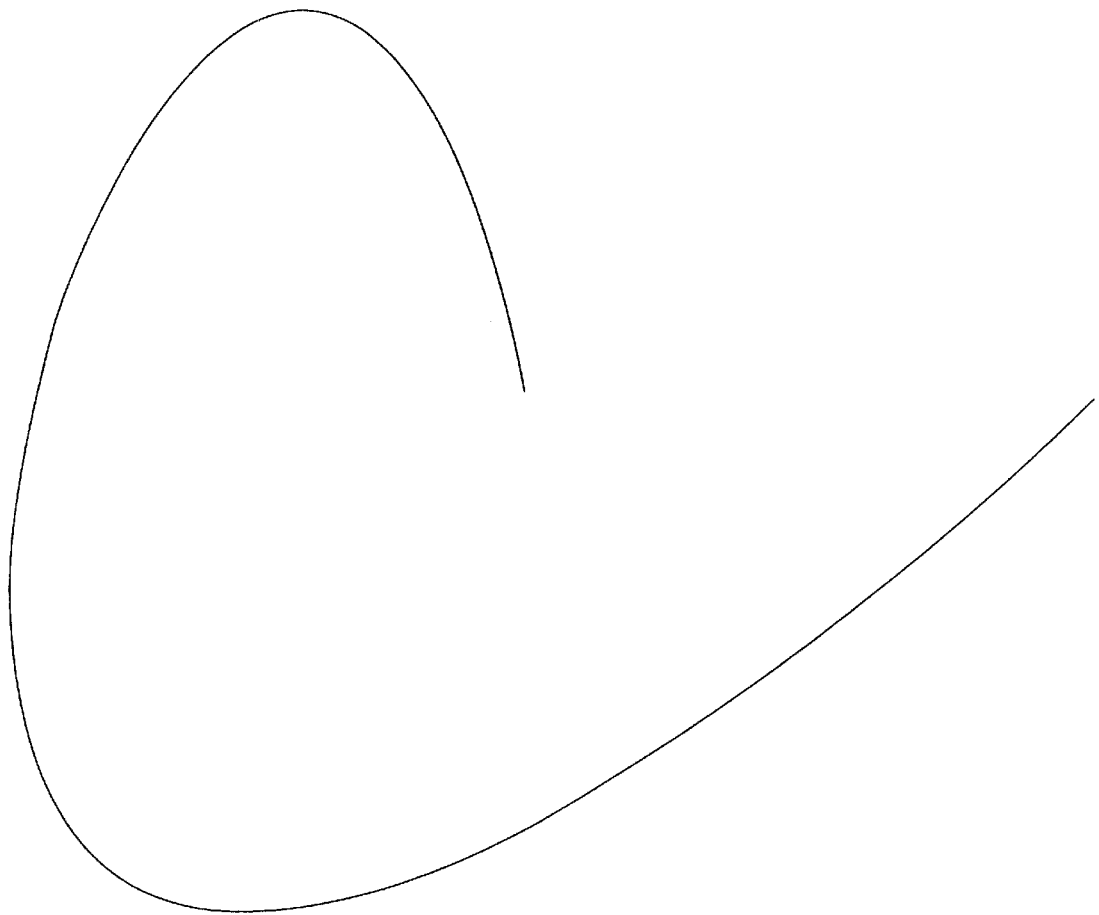

FIG. 12c shows a similar curve (of order 2) produced according to the present invention employing two control points. As shown, the resulting curve, which is composed of circular arc segments, is smooth. The appearance of the curve does not change when the curve is expressed in a standard CAD/CAM format. Moreover, implementation of the curve requires minimal control commands; four commands for arc production in this case.

Figure 12D:
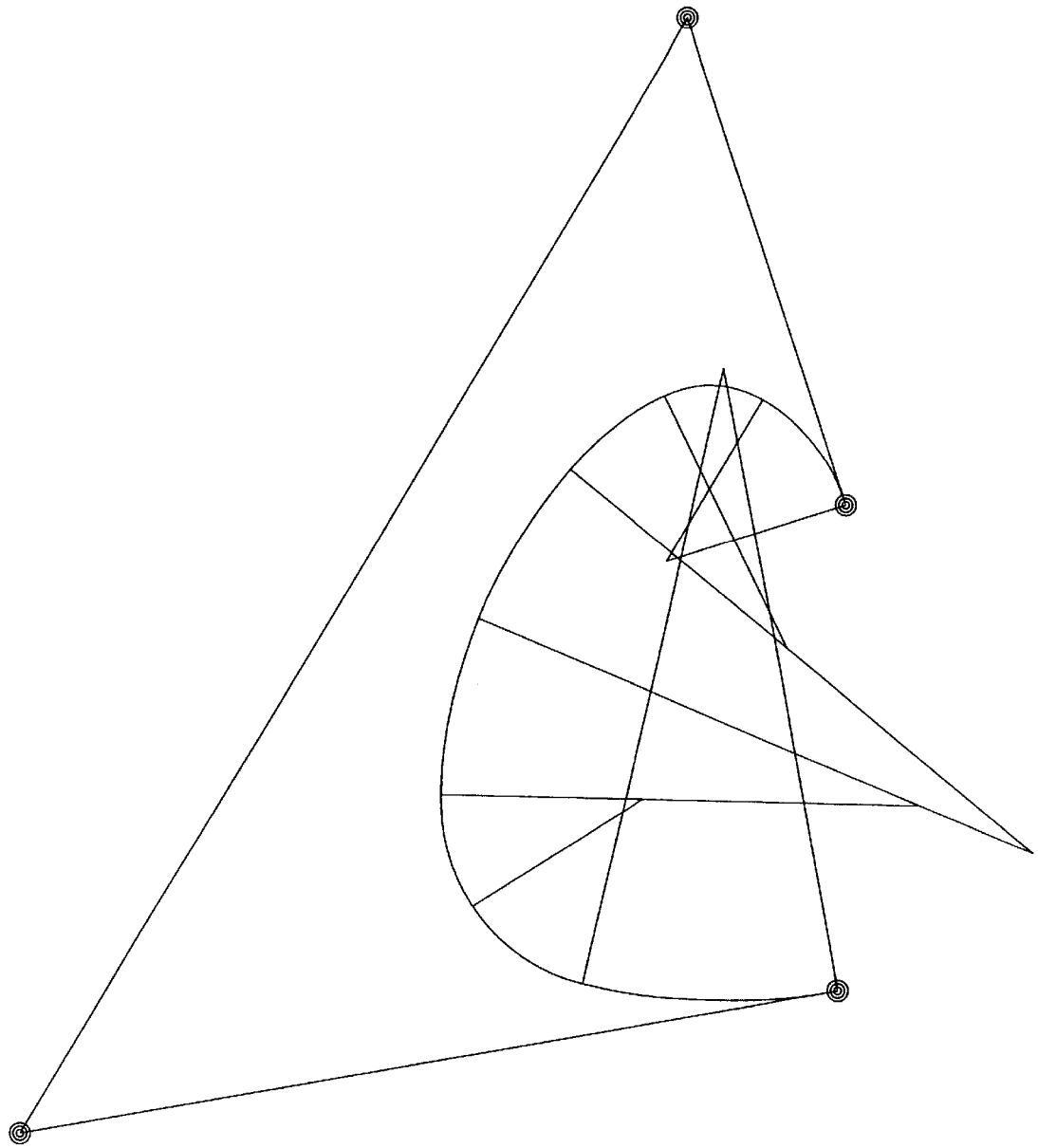
Figure 12E:
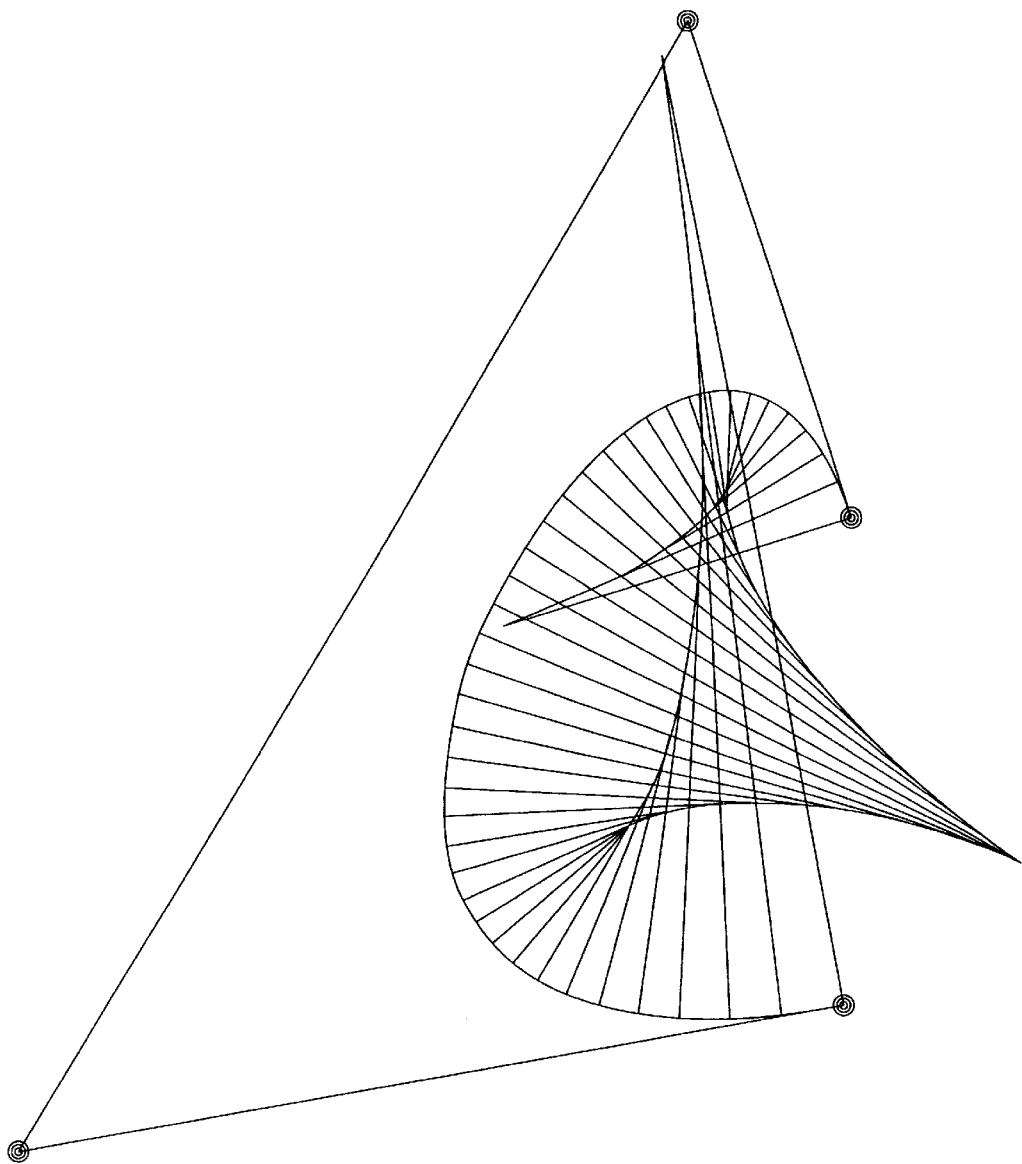
Figure 12F:
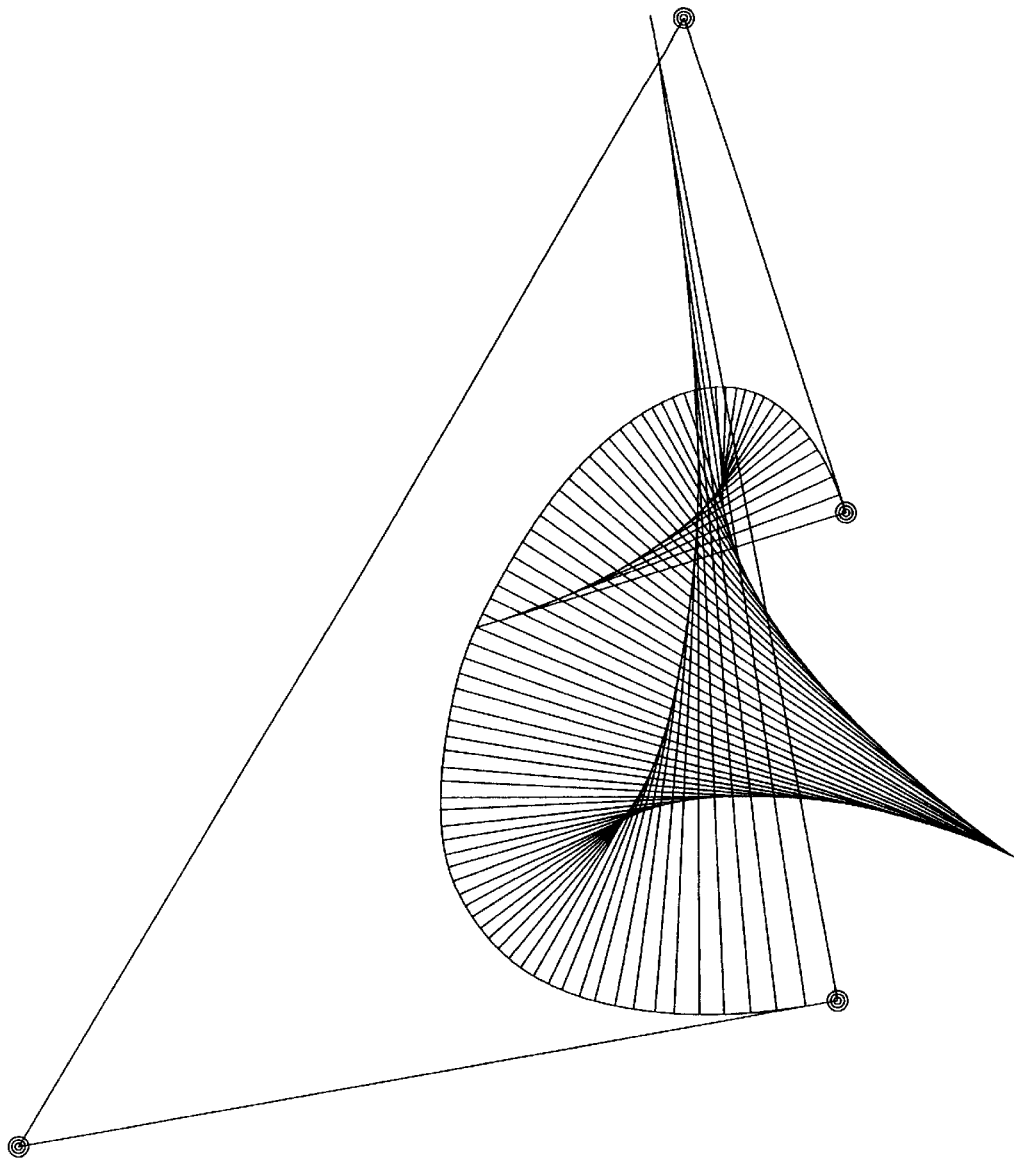

FIGS. 12d–12f illustrate similar curves of order 4, 20 and 40, respectively, produced according to the present invention. Also shown are the control polygon and the radii connecting the centers of curvature for each arc with the arc ends. As shown, each of the resulting curves is smooth. Moreover, the locus of the curvature centers of the arcs define a smooth line. It will be appreciated that the elegant appearance of the construction geometry is not merely fortuitous but is a reflection of the stated design objective of avoiding abrupt changes in curvature. In practice, low order curves are sufficient for many applications.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A method for generating a curve connecting two end points, comprising the steps of:

defining a cartesian coordinate system, including three mutually perpendicular planes;

projecting said end points and at least one control point onto one of the cartesian planes;

defining a polygon relative to said end points and at least one control point, said polygon including a polygon base defined relative to said end points, polygon sides defined relative to said at least one control point;

defining at least two isosceles triangles relative to said polygon, each of said isosceles triangles including a triangle base and two triangle sides, said triangle sides being of equal length, wherein said triangle sides coincide with said polygon sides; and generating said curve relative to said isosceles triangles.

2. The method of claim 1, wherein said end points and said at least one control point define the vertices of a control polygon, and said step of defining a polygon comprises defining a polygon different than said control polygon.

3. The method of claim 2, wherein said step of defining a polygon comprises defining a polygon such that first and second polygon sides of said polygon are collinear with first and second control polygon sides of said control polygon.

4. The method of claim 2, wherein said step of defining a polygon comprises dividing said control polygon to form at least two triangles.

5. The method of claim 2, wherein said step of defining a polygon comprises selecting a set of points including at least one point on each of first and second control polygon sides of said control polygon, and defining said polygon relative to said set of points.

6. The method of claim 1, wherein said step of defining a polygon comprises defining a polygon such that the number of said polygon sides is greater than the number of said at least one control point by at least two.

7. The method of claim 1, wherein said step of defining a polygon comprises defining a polygon having a first polygon side including first and second terminal edges, wherein each of said first and second terminal edges is located apart from said end points and said at least one control point.

8. The method of claim 1, wherein said step of defining a polygon comprises defining a polygon having a first polygon side which is substantially parallel to said polygon base.

9. The method of claim 1, wherein said step of defining a polygon comprises defining a triangle and defining a four-sided polygon located substantially within said triangle.

10. The method of claim 1, wherein said step of defining a polygon comprises defining a polygon having first, second and third sides, wherein the length of said third side is substantially equal to the sum of the lengths of said first and second sides.

11. The method of claim 1, wherein said step of defining at least two isosceles triangles comprises selecting a point apart from said end points and said at least one control point.

12. The method of claim 1, wherein said step of defining at least two isosceles triangles comprises selecting a point on a first polygon side of said polygon.

13. The method of claim 1, wherein said step of generating said curve comprises generating said curve such that said curve is circumscribed by said polygon.

14. The method of claim 1, wherein said step of generating said curve comprises generating said curve such that said curve contacts said polygon at at least three points.

15. The method of claim 1, wherein said step of generating said curve comprises generating said curve such that said curve contacts a first polygon side of said polygon at a location apart from vertices of said polygon.

16. The method of claim 1, wherein said step of generating said curve comprises generating said curve such that said curve includes at least two vertices of each of said isosceles triangles.

17. The method of claim 1, wherein said step of generating said curve comprises generating said curve such that said curve is tangent to at least one side of each of said isosceles triangles.

18. The method of claim 1, wherein said step of generating said curve comprises operating a curve forming device.

19. The method of claim 1, wherein said step of generating said curve comprises cutting a workpiece.

20. The method of claim 1, wherein said step of generating said curve comprises expressing information regarding said curve in a control language of a computer numerical controlled machine.

21. The method of claim 1, wherein said step of generating said curve comprises generating at least two circular arc segments.

22. The method of claim 1, wherein said step of generating said curve comprises defining a center of curvature for a segment of said curve.

* * * * *